J. S. HAWLEY.
Vent-Clearers for Wash-Bowls, &c.
No. 158,937. Patented Jan. 19, 1875.
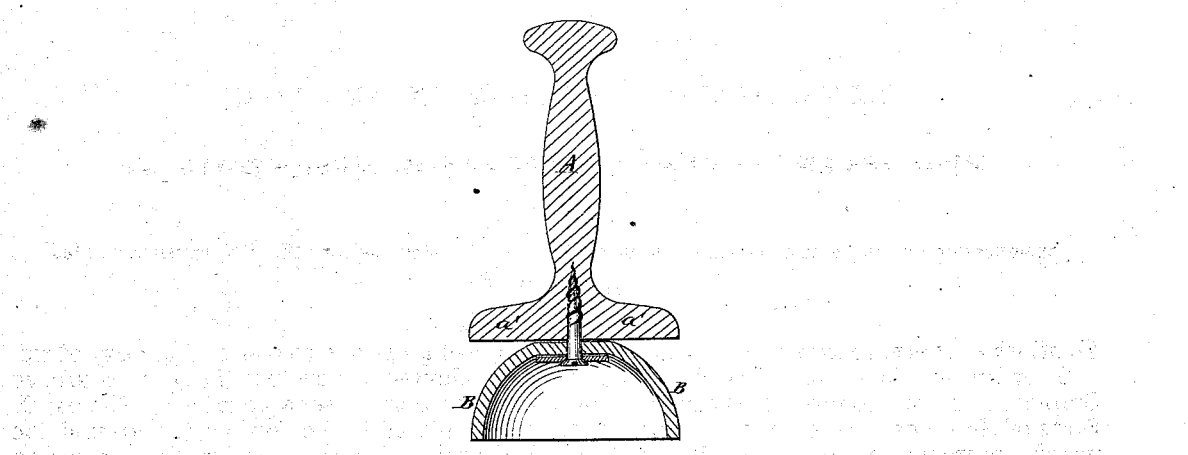
WITNESSES:
INVENTOR:
John S. Hawley
BY
ATTORNEYS.

UNITED STATES PATENT OFFICE.

JOHN S. HAWLEY, OF STAPLETON, NEW YORK.

IMPROVEMENT IN VENT-CLEARERS FOR WASH-BOWLS, &c.

Specification forming part of Letters Patent No. 158,937, dated January 19, 1875; application filed December 19, 1874.

*To all whom it may concern:*

Be it known that I, JOHN S. HAWLEY, of Stapleton, in the county of Richmond and State of New York, have invented a new and useful Improvement in Vent-Clearers for Wash-Bowls, Stationary Wash-Tubs, &c., of which the following is a specification:

The figure is a longitudinal section of my improved vent-clearer.

My invention has for its object to furnish a simple, convenient, and inexpensive device for clearing the vents or discharge-pipes of wash-bowls, stationary wash-tubs, &c., should they become accidentally stopped.

The invention consists in an improved vent-clearer, formed by attaching a rubber cup to a handle, as hereinafter fully described.

A is a handle, upon the lower end of which is formed a disk or enlargement, $a'$. To the disk $a'$ is attached a rubber cup, B, by a screw and washer, or by any other convenient means. The cup B may be made in the form of half a hollow sphere, as shown in the figure; or the cup may be made cylindrical in form, or of any other desired shape.

In using the device a small quantity of water is allowed to flow into the bowl or tub, so as to cover the discharge-orifice. The cup B is then placed in the bowl or tub around the discharge-orifice, and the handle A is forced downward suddenly, so as to force the water beneath the cup B into the discharge-pipe with a sudden impulse, which dislodges the obstruction and allows it to be carried off by the outflowing water.

This device is simple and inexpensive, can be used by any one, and will enable the discharge-pipes to be cleared without the trouble, annoyance, and expense of calling in a plumber every time said pipes become clogged.

Having thus described my invention, I claim as new and desire to secure by Letters Patent—

An improved vent-clearer, formed by attaching a rubber cup, B, to a handle, A, substantially as herein shown and described.

JOHN S. HAWLEY.

Witnesses:
JAMES T. GRAHAM,
T. B. MOSHER.